United States Patent [19]

Nishio et al.

[11] Patent Number: 5,091,222
[45] Date of Patent: Feb. 25, 1992

[54] METHOD FOR FORMING A CERAMIC FILM

[75] Inventors: Hiroaki Nishio; Michitaka Sato; Keiji Watanabe, all of Kawasaki, Japan

[73] Assignee: NKK Corporation, Tokyo, Japan

[21] Appl. No.: 586,801

[22] Filed: Sep. 24, 1990

[30] Foreign Application Priority Data

Sep. 28, 1989 [JP] Japan .................................. 1-252644

[51] Int. Cl.⁵ .............................................. B05D 3/04
[52] U.S. Cl. ...................................... 427/335; 427/377; 427/380; 427/419.2; 427/419.3; 427/419.4; 427/419.7; 427/435; 427/443.2
[58] Field of Search ............... 427/387, 38, 335, 377, 427/380, 419.2, 419.3, 419.4, 419.7, 435, 443.2

[56] References Cited

U.S. PATENT DOCUMENTS 4,911,992  3/1990  Haluska et al. .................. 427/38

FOREIGN PATENT DOCUMENTS 54-146205  11/1979  Japan .

Primary Examiner—Bernard Pianalto
Attorney, Agent, or Firm—Frishauf, Holtz, Goodman & Woodward

[57] ABSTRACT

A method for forming a ceramic film comprises the steps of boiling a solution containing ceramics, dipping a base material into the solution, taking the base material out of the solution and drying the base material taken out of the solution in the presence of vapor of said boiling solution. The solution is a solution, in which ceramics is dispersed or dissolved. The solution is a solution, in which a precursor of ceramics is dispersed or dissolved.

24 Claims, 1 Drawing Sheet

METHOD FOR FORMING A CERAMIC FILM

BACKGROUND OF THE INVENTION

1. Field of the Invention

The present invention relates to a method for forming a ceramic film on the surface of a base material.

2. Description of the Related Arts

There is a method for forming a compact by casting molten metal or slurry into a ceramic mold. It is known in this method that, after the surface of a pattern made from wax, polystyrene or urea has been coated with ceramic powder, said pattern is removed. Said pattern is dissipated by being heated and melted or by solvent extraction. A ceramic film, with which the pattern has been coated, is used for a mold. As the ceramic powder, mullite, zircon, fused silica or alumina is pointed out.

A method wherein a porous compact is converted to a dense sintered body is disclosed in a Japanese Patent Publication Laid Open No. 146205/79. The surface of a compact made from metallic powder or ceramic powder is coated with ceramic powder. The compact having a film of ceramic powder on the surface thereof is heated and sintered. The film of ceramic powder is converted to a gas-impermeable dense film. The compact with said film is subjected to a hot isostatic hydraulic pressing process. As the ceramic powder, borosilicate glass, high-silicate glass, silica glass, silicon nitride, alumina or boron nitride is pointed out.

It is also known that a film of ceramics or ceramic precursor is formed on the surface of a base material to change the surface properties of the base material.

In those methods, ceramic powder is dispersed in water or organic solvent. A slurry thus prepared is regulated by adding inorganic or organic binder to the slurry if necessary. A pattern or a compact, which is dissipated by being heated and melted or by solvent extraction, is dipped into the slurry, and the surface of the pattern or the compact is coated with the slurry. After the pattern or the compact has been coated with the slurry, the pattern or the compact coated with the slurry is dried. It is also known that the coating of the pattern or the compact with the slurry and the dip of the pattern or the compact into the slurry are alternately carried out.

In the method wherein the base material is dipped into the slurry, the ceramic powder insufficiently adheres to the base material, and the density of the film becomes unequal. On the other hand, in the case of dipping the base material into liquid of the precursor of ceramics, the precursor of ceramics insufficiently adheres to the base material, and air having adsorbed to the surface of the base material is taken in the film. In the case of dipping the base material whose surface is coated with slurry into a fluidized layer of ceramic powder, the density of the film becomes unequal because ceramic powder is liable to aggregate in the fluidized layer of ceramic powder. For the aforementioned reasons, cracks are often generated on the surface of the base material at the successive step of heat treatment.

SUMMARY OF THE INVENTION

It is an object of the present invention to form a highly reliable film, in which cracks are not generated in the film formed on the surface of a base material by heat treatment.

To attain the aforementioned object, the present invention provides a method for forming a ceramic film, comprising the steps of:
  boiling a solution containing ceramics;
  dipping a base material into said solution;
  taking said base material out of said solution; and
  drying said base material taken out of the solution.

The above object and other objects and advantages of the present invention will become apparent from the detailed desctiption which follows, taken in conjunction with the appended drawings.

DESCRIPTION OF THE PREFERRED EMBODIMENT

Figure 1:
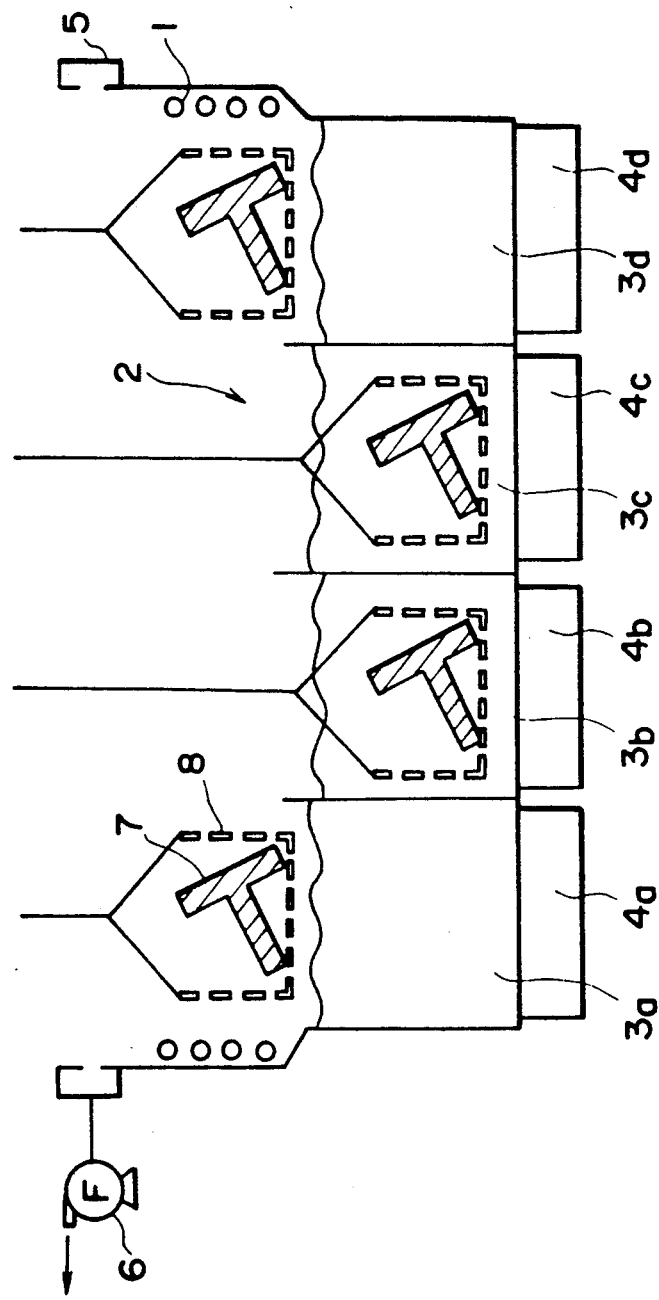
FIG. 1 is a sectional view schematically illustrating an apparatus used in the present invention.

In the preparation of a base material of the present invention, materials are selected in accord with the purpose of use of the materials, and said materials are formed into a predetermined shape.

In the case of a pattern used for producing a ceramic shell mold, wax, polystyrene, urea or the like is used as material for making the pattern. Said pattern is formed into a shape of cavity for the mold. Said pattern is dissipated by being heated and melted or by the solvent extraction.

When a gas-impermeable film is formed on the surface of a compact to subject a compact made from metallic powder or ceramic powder to a hot isostatic hydraulic pressing process, materials used for the compact are not specifically limited. In the case of metallic powders, as the base material, powders of ferroalloy such as powders of stainless steel and high-speed steel, powders of aluminium alloy, copper alloy, nickel alloy, cobalt alloy and molybdenum alloy are used. As ceramic powders, powders of oxides, nitrides, borides, oxides-nitrides or carbides-nitrides are used. As the nitrides, silicon nitride, aluminium nitride or titanium nitride is pointed out. As the carbides, silicon carbide, boron carbide or titanium carbide is used. As the borides, titanium diboride or zirconium diboride is used. As the oxynitride, SIALON is pointed out. As the carbo-nitride, titanium carbo-nitride is pointed out. Cermet such as alumina-nickel alloy or tungsten carbide-cobalt is used for matertial of a compact. Carbon materials such as isotropic graphite can be used for materials of a compact.

Ceramics or a precursor of ceramics is used as materials for forming a film. The materials are selected in accord with the purpose of forming the film or the use of the film.

In the case of making a ceramic shell mold, ceramic powder and binder are used. As the powder, powder of alumina, mullite, zircon or fused silica is used. As the binder, the precursor of ceramics such as hydrolysis solution of tetraethoxysilane, colloidal silica or the like is used.

When a gas-impermeable film is formed on a compact of powders, glass or a precursor of ceramics is used as material for forming a film. As the glass, borosilicate glass, high-silicate glass or fused silica is pointed out. As the precusor of ceramics, the hydrolysis solution of tetraethoxysilane, colloidal silica or polysilazane is used.

A film of ceramics is formed on the surface of the base material to make up for a defect of the base material. Materials for forming the film of ceramics are selected dependent on their objects and use. Starting materials can be ceramics or the precursor of ceramics. The starting materials can be in the form of powder or liquid. The starting materials are desired to be ceramics when the base material is ceramics.

As the ceramic powders, oxides such as alumina, zirconia, mullite or yttria, nitrides such as silicon nitride, aluminium nitride or titanium nitride, carbides such as silicon carbide, boron carbide or titanium carbide, borides such as titanium diboride or zirconium diboride, oxynitride such as SIALON and titanium carbo-nitride are pointed out.

The precursor of ceramics is one selected from the group consisting of precursors of oxides, silicon nitride and silicon carbide. As the precursor of oxides, tetraethoxysilane is used. As the precursor of silicon nitride, polysilazane is used. As the precursor of silicon carbide, polysilostyrene or polycarbosilane can be used.

As an example wherein a film of ceramics is formed on the surface of a base material to make up for defects of the base material, an example wherein a film of silicon carbide resistant to oxidation is formed on the surface of a sintered carbon body and an example wherein a film of chromium carbide resistant to corrosion is formed on the surface of high-speed steel are pointed out.

The particle size of ceramics and the particle size of the precursor of ceramics when it is used in the state of being dispersed are from about 0.2 to 500 μm.

A solvent having a boiling point of from about 20° to 150° C., in which ceramics or the precursor of ceramics is dispersed or dissolved, is desired. The solvent having a boiling point of from 20° to 60° C. is preferred. When the boiling point is less than 20° C., the temperature of a solution, into which ceramics or the precursor of ceramics is dispersed or dissolved, fluctuates, being affected by the atmosphere in a room. The state of the solution at the boiling point is affected by the fluctuation of the temperature of the solvent, by which the state of the solution at the boiling point becomes hard to regulate. When the boiling point exceeds 150° C., the base material is required to be heated up to a temperature over 150° C. The base material can be impaired during this heating. Since the solvent is used in its state at the boiling point, a solvent having a high boiling point is not desirable.

As the solvent, an azeotropic mixture of trichlorotrifluoroethane, an azeotropic mixture of tetrachlorodifluoroethane, trichloromonofluoromethane, trichloroethane, trichloroethylene, perchloroethylene, methylene chloride, benzene, toluene, xylene, methanol, ethanol or isopropanol is pointed out. As the azeotropic mixture of trichlorofluoroethane, azeotropic mixtures of trichlorotrifluoroethane with ethanol, methylene chloride, isopropanol or acetone is pointed out. As the azeotropic mixture of tetrachlorodifluoroethane, an azeotropic mixture of tetrachlorodifluoro-ethane with trichlorotrifluoroethane, isooctane or normal-propanol is pointed out.

The concentration of ceramics or the precursor of ceramics which is dispersed or dissolved in the solvent is changed depending on the thikness of the film to be formed. The concentration is usually about 10 to 800 parts of ceramics or the precursor of ceramics by weight to 100 parts of the solvent by weight.

The fluidity of the solvent can be regulated by adding a dispersant or a thickner to the solvent. As the dispersant, oleic acid is pointed out. As the thickner, polyvinylalcohol, polyvinylbutyral, methylcellulose, carboxymethylcellulose, ethylcellulose, paraffin wax or phenol resin is used.

A plurality of solutions of various compositions can be prepared. The base material is dipped into one solution, then taken out of the solution and dried. Successively, the base material is dipped into another solution, then taken out of the solution and dried. A plurality of layers of various compositions can be formed on the surface of the base material by repeating operations such as those of dipping the base material into each of the solutions, taking the base material out of each of the solutions and drying the base material.

The solutions, in which the ceramics or the precursor of ceramics are dispersed or dissolved, are used in the boiling state. The base material is dipped into the boiling solutions for a short period of time, that is, usually for 5 to 60 sec. The base material is dried after it has been dipped into the solutions and taken out of the solutions. It is unnecessary in the drying of the base material to perfectly remove the solvent from the base material. It is sufficient to remove the solvent from the base material to a predetermined degree. The degree of the drying of the base material is determined depending on the use of the base material.

When the base material is dipped into boiling solution, a film having a uniform thickness and good adhesiveness is formed in comparison with the case where the base material is dipped into static solution or solution being stirred by an ordinary stirrer. This is because the solution or the slurry penetrates into minute concavities on the surface of the base material due to a strike of bubbles rising in the solution to the surface of the base material. In the case of the slurry, the aggregattion of powders is loosened by a climb motion of the bubbles, by which dispersion of the powders in the slurry is promoted. The dispersed powders form a layer of uniform density on the surface of the base material. Even when aggregated powders adhere to the film formed in layers, the aggregated powders are broken by the strike of the bubbles against the powders and removed.

An apparatus to be used for the method of the present invention comprises a vessel, in which the solvents are put, and a heater for heating the solvents. A condenser for cooling and recovering vapor of the solvents is positioned above a boiling zone of the solvents inside the vessel. The condenser can be arranged inside the vessel, or the condenser can be put above the vessel which is made airtight and is connected to the vessel. When the vessel is made airtight, the vessel is required to have a structure, in which a compact can be put into the vessel and taken out of the vessel. The heater for heating the solvents can be positioned inside the vessel or outside the vessel. When the heater is put outside the vessel, the solvents should be circulated between the vessel and the heater.

EXAMPLE 1

Paraffin wax having a melting point of 80° C. was melted into solution of 100° C. Said solution was cast into a mold having a cavity. The cavity has a form, in which a shaft of 6 mm in diameter and 60 mm in length is connected to the center of a disk of 50 mm in diameter and 10 mm in thickness. After the solution inside the mold had been solidified, the mold was separated from the paraffin wax, by which a pattern made from the paraffin wax was obtained. Said pattern is dissipated by a treatment which will be described later.

Subsequently, a ceramic shell was formed on the surface of the pattern having dissipating property by means of an apparatus as shown in FIG. 1. This apparatus had a condensing zone 2 on the upper side of the apparatus where water-cooled coils 1 were arranged and cooling water flowed and boiling zones 3a, 3b, 3c and 3d which were made by dividing the lower side of the apparatus. Four heat transfer heaters 4a, 4b, 4c and 4d for heating the boiling zones were arranged on the lower side of the boiling zones. An exhaust duct 5 was positioned at the top of the condensing zone. The exhaust duct sucked in vapor remaining not condensed by means of an exhaust fan 6.

Cooling water of 10° C. was caused to flow through the water-cooled coils. 70 parts of methanol by weight and 30 parts of inorganic polysilazane by weight were charged into the boiling zone 3a, 30 parts of methanol by weight, 50 parts of zircon flour of 130 mesh by weight and 20 parts of inorganic polysilazane by weight into the boiling zone 3b, 50 parts of methanol by weight and 50 parts of zircon sand of 325 mesh by weight into the boiling zone 3c, and 50 parts of methanol by weight and 50 parts of high-alumina sand of 0.3 to 0.7 mm in particle size into the boiling zone 3d. Electric heaters 3a, 3b, 3c and 3d were switched on in order that methanol can be constantly circulated by means of vaporization in the condensing zone and condensation in the condensing zone.

The aforementioned pattern having a dissipating property as the base material 7 was put into a basket 8. The basket 8 with the pattern therein was hung in the condensing zone 2 and the pattern was preheated by vapor of methanol. After it had been confirmed that drops of solution condensed on the surface of the base material 7 and the basket 8 were not observed, the basket 8 with the base material 7 therein was dipped into the boiling zone 3a and kept as it was in the boiling zone 3a for 3 sec. Then, the basket 8 with the base material 7 therein was lifted into the condensing zone 2 and dried in methanol vapor. Subsequently, the basket 8 with the base material 7 therein was dipped into the boiling zone 3b and kept as it was therein for 30 sec. Then, the basket with the base material therein was lifted into the condensing zone 3 and dried in vapor of methanol. The base material thus treated was dipped into the boiling zone 3c and kept as it was for 30 sec. The base material was lifted into the condensing zone 2 and dried therein. The dip of the base material into the boiling zones 3b and 3c was repeated twice. Subsequently, the dip of the treated base material into the boiling zone 3b for 3 sec., the drying thereof in the condensing zone 2, the dip thereof into the boiling zone 3d for 30 sec. and the drying thereof in the condensing zone 2 were twice repeated respectively. The base material thus treated was dipped into the boiling zone 3b and kept as it was for 3 sec., lifted into the condensing zone 2, dried therein and taken out of the condensing zone 2.

After the aforementioned operations, the treated base material was put into an autoclave, kept as it was in an atmosphere of vapor of 6 atm. for 30 sec. and dewaxed. The treated base material was taken out of the autoclave. 10 mm of the top portion of the shaft was cut. As a result, a ceramic shell mold, in which no paraffin remained, which had not any crack, entanglement of bubbles and oozing of wax on the surface thereof and which had a film of uniform thickness and little irregularities was obtained. The thickness of the film was about 4 mm.

Subsequently, $Si_3N_4$ was cast into this mold. 27.6 parts of fluid paraffin by weight and 3.0 parts of oleic acid by weight were added to 92.0 parts of $Si_3N_4$ of 0.7 $\mu$m in average particle size by weight, 6.0 parts of $Y_2O_3$ of 0.5 $\mu$m in average particle size by weight as sintering auxiliary, 2.0 parts of $Al_2O_3$ of 1.20 $\mu$m in average particle size by weight, and they were mixed and kneaded for 24 hours. A slurry obtained was exposed in a vacuum atmosphere to remove bubbles from the slurry. This slurry was cast into the aforementioned ceramic shell mold at a pressure of 3 kg/cm². The pressure, at which the slurry was cast into the mold, was temporarily decreased at the beginning of the casting. After it had been confirmed that the pressure was recovered to 3 kg/cm², the mold with the slurry therein was removed. Notwithstanding that the mold is filled up with the slurry, to which the pressure of 3 kg/cm² was applied during the casting, the mold had not any defect such as a crack and oozing of the slurry. That is, the mold was in a sound state.

The slurry, with which the ceramic shell mold was filled up, was charged into a degreasing furnace together with the ceramic shell mold. The slurry was heated up to 500° C. at a rate of 3° C. per hour by circulating nitrogen gas in the degreasing furnace. After the slurry had been heated upto 500° C., the slurry was kept as it was for 2 hours, naturally cooled as it was and the pressure inside the degreasing furnace was decreased to the atmospheric pressure. The slurry thus treated was taken out of the degreasing furnace, and the ceramic shell was removed from the treated slurry, by which a compact was obtained. The apparent density of the compact was 58% of a theoretical density.

EXAMPLE 2

A film of glass powder for forming a gas-impermeable film was formed on the surface of the compact obtained in the Example-1 by using the apparatus as shown in FIG. 1. Cooling water of 10° C. was caused to flow through the water-cooled coils 1. 70 parts of methylene chloride by weight, 27 parts of boron nitride of 1.4 $\mu$m in average particle size by weight and 3 parts of inorganic polysilazane by weight were charged into the boiling zone 3a, 50 parts of methylene by weight, 40 parts of high-silicate glass ($SiO_2$—1.0 wt. % $B_2O_3$—0.5 wt.% $Al_2O_3$) of 3 $\mu$m in average particle size by weight and 10 parts of inorganic polysilazane by weight into the boiling zone 3b respectively. Then, the electric heater 4a and 4b were switched on in order that methylene chloride can be constantly circulated by means of the vaporization in the boiling zone and the condensation in the condensing zone.

The aforementioned compact of silicon nitride as the base material 7 was put into a basket 8. The basket 8 with the base material 7 therein was hung in the condensing zone 2 on the boiling zone 3a and preheated by vapor of methylene chloride. After it had been confirmed that drops of solution condensed on the surface of the base material 7 and the basket 8 were not observed, the basket 8 with base material 7 therein was dipped into the boiling zone 3a and kept as it was in the boiling zone 3a for 30 sec. Then, the basket 8 with the base material 7 therein was lifted into the condensing zone 2 and dried there in vapor of methylene chloride. Then, the base material was dipped into the boiling zone 3b and kept as it was for 30 sec. and dried. Those operations were four times repeated. Thereafter, the base material was taken out of the apparatus. As a result, a film without any defect such as entanglement of bubbles and cracks and with little irregularities was formed on the surface of the base material.

The base material thus treated was put into a HIP apparatus. The base material was heated upto 1300° C. by exhausting gas from the HIP apparatus, and nitrogen gas of 1 kg/cm² (hereinafter, represented by gauge pressure) was supplied into the HIP apparatus. The base material was heated upto 1600° C. and kept as it was for one hour. Until this moment, the pyrolysis of inorganic polysilazane, the generation of $Si_3N_4$ and the conversion of high-silicate glass to a gas-impermeable film due to softening of the high-silicate glass were carried out.

Successively, gas began to be injected into the HIP apparatus under elevated pressure, the treated base material being kept therein at a temperature of 1600° C., and the pressure of gas was increased up to 1700 kg/cm². Further, the elevation of the pressure and the temperature was carried out in parallel. The pressure was elevated upto 2000 kg/cm² and the temperature up to 1700° C. The base material was kept as it was at the aforementioned pressure and temperature. Then, the pressure was decreased and the base material was naturally cooled, by which the hot isostatic hydraulic pressing process finished.

Samples underwent sandblasting to remove the film on the surface of the base material. As a result, a dense compact having 99.5% of the theoretical density was obtained.

As described above, it was understood that the film which was formed on the surface of the compact by means of the aforementioned method contributes to the formation of a highly-reliable gas-impermeable film.

EXAMPLE-3

A film of a precursor of ceramics for forming a film resistant to oxidation was formed on a sintered isotropic graphite body by using the apparatus as shown in FIG. 1. Firstly, cooling water of 10° C. was caused to flow through the water-cooled coils 1. 70 parts of methylene chloride by weight, 20 parts of silicon nitride of 0.25 μm in average particle size by weight and 10 parts of inorganic polysilazane by weight were charged into the boiling zone 3a. Then, the electric heater 4a was switched on so that methylene chloride can be constantly circulated by vaporization in the boiling zone 3a and condensation in the condensing zone 2.

The sintered isotropic graphite body of 2.01 g/cm² in apparent density was put into a basket 8, and the basket with said body therein was hung in the condensing zone 2 on the boiling zone 3a. The basket with the body was preheated by vapor of methylene chloride in the condensing zone 2. After it had been confirmed that solution drops on the surface of the base material and the basket 8 were not observed, the basket 8 with the base material 7 therein was dipped into the boiling zone 3a, kept for 30 sec., and dried in the condensing zone 2. After those operations had been 8 times repeated, the basket 8 with the base material 7 was taken out of the apparatus. As a result, a film which has not any defect such as entanglement of bubbles and cracks and which has a smooth surface was formed.

The base material having the aforementioned film was put into a heating furnace, heated up to 600° C. at a rate of 10° C./min., kept as it was for one hour, and naturally cooled. Then, the base material was put into a sintering furnace, heated upto 1500° C. in an atmosphere of argon at a rate of 30° C./min., kept as it was for 5 hours, and naturally cooled. As a result, a film of silicon carbide could be formed on the surface of the sintered body. This sintered body was kept at 1200° C. in the atmosphere for 100 hours. Except that it was observed that the weight of the sintered body increased by only 0.21 wt. %, there was no change in the sintered body.

As described above, the film of silicon carbide which was formed on the surface of the sintered isotropic graphite showed a very high resistance to oxidation.

What is claimed is:

1. A method for forming a ceramic film, comprising the steps of:
   heating a solution containing ceramics to produce a boiling solution;
   dipping a shaped base material into said boiling solution;
   taking said shaped base material out of said solution with the surface thereof carrying solution containing ceramics; and
   drying said shaped base material, which has been taken out of the boiling solution in the vapor of the solvent above said boiling solution to form a ceramic film on the surface of said shaped base material.

2. The method of claim 1, wherein said solution are a solution, in which ceramics is dispersed.

3. The method of claim 2, wherein said ceramics has a particle size of 0.2 to 500 μm.

4. The method of claim 1, wherein said solution is a solution, in which ceramics is dissolved.

5. The method of claim 1, wherein said solution is a solution, in which a precursor of ceramics is dispersed.

6. The method of claim 5, wherein said precursor of ceramics are particles having a particle size of 0.2 to 500 μm.

7. The method of claim 1, wherein said solution is a solution, in which the precursor of ceramics is dissolved.

8. The method of claim 1, wherein said solution comprises a solvent having a boiling point of 20° to 150° C.

9. The method of claim 8, wherein said solvent has a boiling point of 20° to 60° C.

10. The method of claim 8, wherein said solvent is one selected from the group consisting of an azeotropic mixture of trichlorotrifluoroethane, an azeotropic mixture of tetracholordifluoroethane, trichloromonfluoromethane, trichloroethane, perchloroethylene, methylene chloride, benzene, toluene, xylene, methanol, ethanol and isopropanol.

11. The method of claim 10, wherein said ceramics in said solution are particles having a particle size 0.2 to 500 μm and wherein the thickness of said ceramic film is increased by dipping said shaped base material having a first ceramic film on the surface thereof into a boiling solution containing ceramics and taking said shaped base material out of said solution with the surface thereof carrying solution containing ceramics from said second boiling solution and drying said shaped base material which has been taken out of said second boiling solution in the vapor of the solvent from said second boiling solution to form a ceramic film of the ceramic of said second boiling solution on top of said first ceramic film.

12. The method of claim 10, wherein said ceramics in said solution are dissolved (i) ceramics or (ii) a precursor thereof and wherein the thickness of said ceramic film is increased by dipping said shaped base material having a first ceramic film on the surface thereof into a boiling solution containing ceramics and taking said shaped base material out of said solution with the surface thereof carrying solution containing dissolved ceramics or a precursor thereof from said second boiling solution and drying said shaped base material which has been taken out of said second boiling solution in the vapor of the solvent from said second boiling solution to form a ceramic film of the ceramic of said second boiling solution on top of said first ceramic film.

13. The method of claim 1, wherein said ceramics is one selected from the group consisting of alumina, mullite, zircon and fused silica.

14. The method of claim 1, wherein said ceramics is one selected from the group consisting of borosilicate glass, high-silicate glass and fused silica.

15. The method of claim 1, wherein said ceramics includes a precursor of ceramics.

16. The method of claim 13, wherein said precursor of ceramics is one selected from the group consisting of solution for hydrolysis solution of tetraethoxysilane, colloidal silica and polysilazane.

17. The method of claim 1, wherein said ceramics is one selected from the group consisting of silicon nitride, aluminium nitride and titanium nitride.

18. The method of claim 1, wherein said ceramics is one selected from the group consisting of silicon carbide, boron carbide and titanium carbide.

19. The method of claim 1, wherein said ceramics is one selected from the group consisting of titanium diboride, zirconium diboride, SIALON and titanium carbonitride.

20. The method of claim 1, wherein said base material is made from one selected from the group consisting of wax, polystyrene and urea.

21. The method of claim 1, wherein said base material is made from metallic powders.

22. The method of claim 1, wherein said base material is made from ceramic powders.

23. The method of claim 1, wherein said precursor of ceramics is one selected from the group consisting of a precursor of a ceramic oxide, a precursor of silicon nitride and a precursor of silicon carbide.

24. The method of claim 1, wherein said ceramics is one selected from the group consisting of alumina, zirconia, mullite and yttria.

* * * * *